(No Model.) 2 Sheets—Sheet 1.

G. OTTINO & A. RAFFO.
ICE CREAM FREEZER.

No. 532,987. Patented Jan. 22, 1895.

WITNESSES:
Chas. Nida
Theo. G. Hoster

INVENTORS
G. Ottino
A. Raffo
BY
Munn & Co
ATTORNEYS.

(No Model.) 2 Sheets—Sheet 2.

G. OTTINO & A. RAFFO.
ICE CREAM FREEZER.

No. 532,987. Patented Jan. 22, 1895.

WITNESSES:

INVENTORS
G. Ottino
A. Raffo
BY
Munn & Co.
ATTORNEYS.

UNITED STATES PATENT OFFICE.

GIUSEPPE OTTINO AND ANTONIO RAFFO, OF NEW YORK, N. Y.

ICE-CREAM FREEZER.

SPECIFICATION forming part of Letters Patent No. 532,987, dated January 22, 1895.

Application filed September 17, 1894. Serial No. 523,173. (No model.)

*To all whom it may concern:*

Be it known that we, GIUSEPPE OTTINO, a subject of the King of Italy, and ANTONIO RAFFO, a citizen of the United States, residing in New York city, in the county and State of New York, have invented a new and Improved Ice-Cream Freezer, of which the following is a full, clear, and exact description.

The object of the invention is to provide a new and improved ice cream freezer, which is comparatively simple and durable in construction and arranged to quickly produce ice cream of a high grade.

The invention consists of certain parts and details and combinations of the same, as will be fully described hereinafter and then pointed out in the claims.

Reference is to be had to the accompanying drawings, forming a part of this specification, in which similar letters of reference indicate corresponding parts in all the figures.

Figure 1:
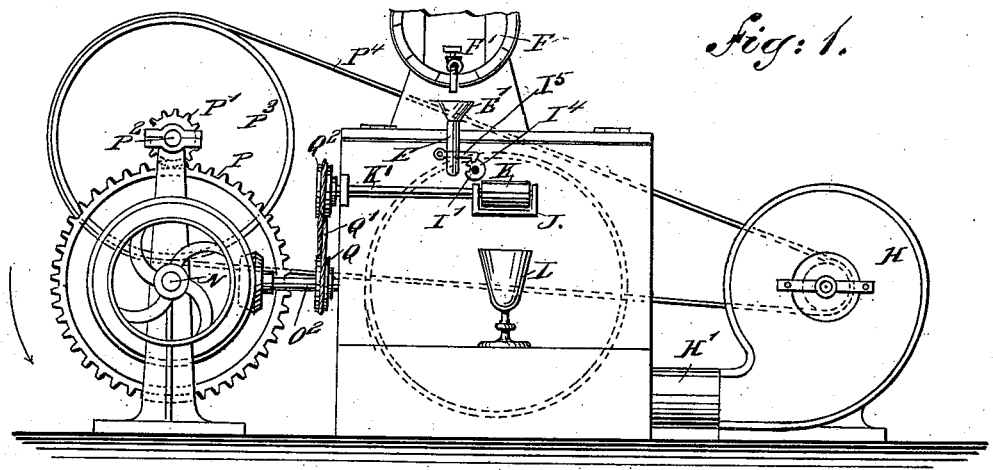
Figure 2:
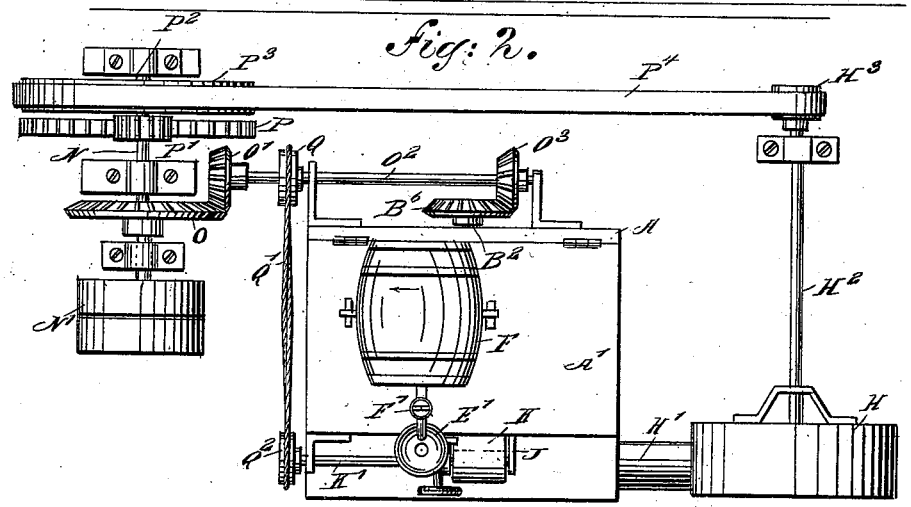
Figure 3:
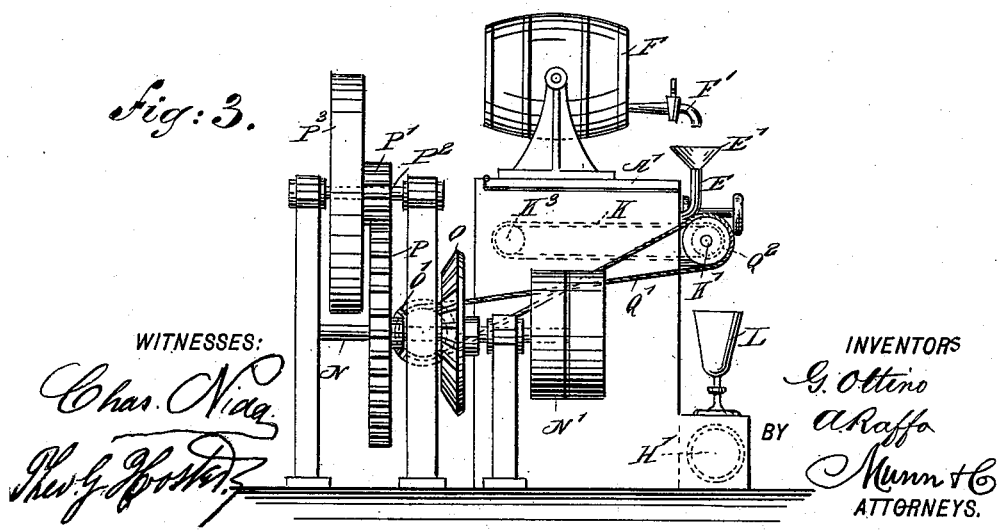
Figure 5:
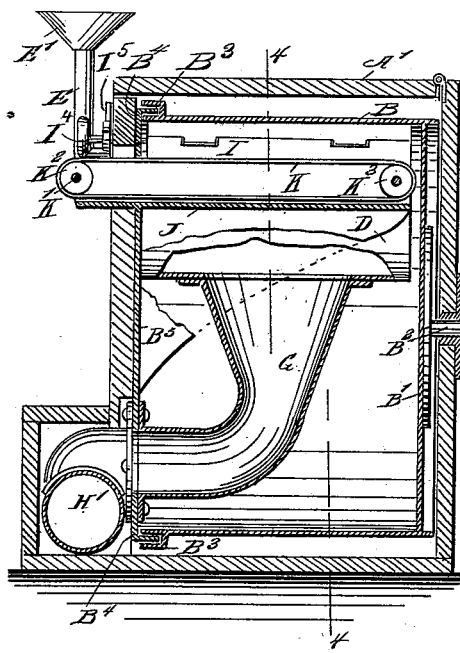
Figure 4:
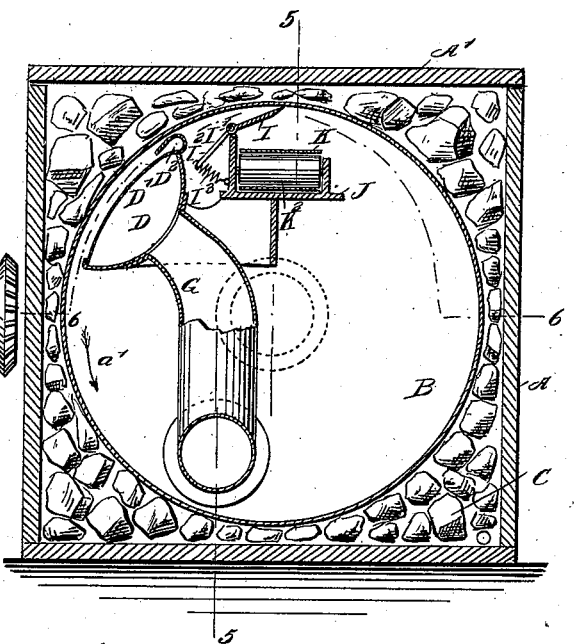
Figure 6:
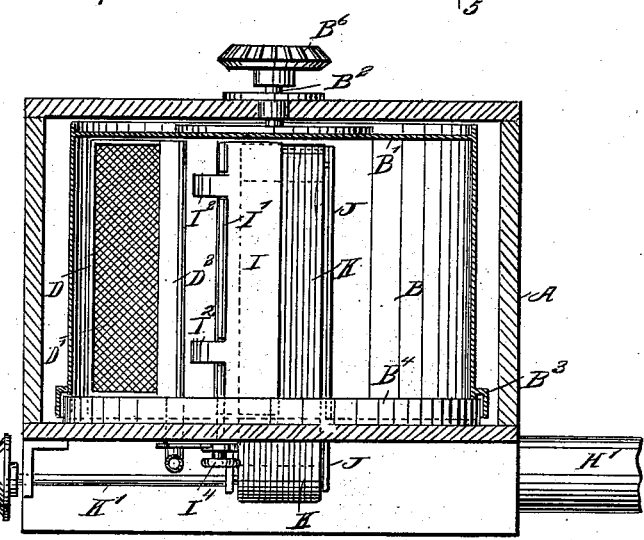

Figure 1 is a side elevation of the improvement. Fig. 2 is a plan view of the same. Fig. 3 is an end elevation of the same. Fig. 4 is an enlarged sectional side elevation of the freezer proper, the section being taken on the line 4—4 of Fig. 5. Fig. 5 is a transverse section of the same on the line 5—5 of Fig. 4; and Fig. 6 is a sectional plan view of the same on the line 6—6 of Fig. 4.

The improved ice cream freezer is provided with a suitably constructed box or casing A having a hinged cover A', and containing a revoluble cylinder B, around which the ice C is packed within the box or casing A, as plainly indicated in Fig. 4. The cylinder B is provided with a rear closed B' carrying a shaft $B^2$, mounted to turn in suitable bearings back of the box or casing A, the front end of the said cylinder being open and formed at its front edge with an annular pocket $B^3$, into which extends an annular flange $B^4$ forming part of the front head $B^5$ secured to the inner face of the box or casing A. The pocket $B^3$ is thus supported in the flange $B^4$, to properly support the front end of the said cylinder, as the same is revolved with the box or casing A.

In the cylinder B and near the rim thereof, is arranged a transversely extending air blast chamber D having a segmentally perforated plate D', concentric to the rim of the cylinder B, as plainly illustrated in Fig. 4, the said plate being formed, at its upper end, into a feed pipe $D^2$ opening onto the top surface of the plate and, connected at its outer end with a pipe E formed with a funnel E', into which the cream or other liquid to be frozen, is discharged through a faucet F' of a barrel F containing the cream or other liquid. This barrel F, is supported on the hinged cover A', but any other suitable receptacle containing the liquid to be frozen, may be employed; or, the liquid may be by other means discharged into the funnel E' to flow through the pipe E into the feed pipe $D^2$, delivering the cream or other liquid in a thin stream over the perforated plate D', so as to flow down over the same to be acted upon by an air blast from the chamber D, so as to minutely divide the cream or liquid, and to force the minutely divided particles against the inner surface of the cylinder B, revolving in the direction of the arrow $a'$.

The chamber D is supported from the fixed head $B^5$, and is provided with an air blast pipe G, likewise supported from the head $D^5$ and connected with the discharge pipe H' of a fan or blower H, of any approved construction. The chamber D is arranged at one side in the cylinder B near the top thereof, so that the perforated plate or sieve D' extends in a sufficiently inclined direction to cause the liquid to readily flow over the said plate or sieve, to be acted on by the air blast coming from the blower H.

As the cream or other liquid is blown in a finely divided state into the cylinder B, it is readily frozen owing to the low temperature of the said cylinder, the latter being derived from the ice C surrounding the said cylinder. The frozen liquid is carried around on the inner face of the rim of the cylinder B, to finally come in contact, near the top of the cylinder, with a scraper I extending transversely over an endless carrier belt K, mounted in a suitably constructed carrier frame J, attached to the fixed head $B^5$ and extending through the front of the casing A to the outside thereof, as is plainly illustrated in the drawings. The outer end of the carrier belt K discharges the frozen cream, or other similar substance, into a suitable vessel L, supported on the outside of the casing.

The scraper I is pivoted at I' on one side of the carrier frame J as is plainly illustrated in Fig. 4, and the said scraper is provided with projections $I^2$ connected with springs $I^3$ held on the carrier frame $I^3$, and serving to draw the free end of the scraper I in contact with the inner surface of the rim of the cylinder B. The pivot I' of the scraper I, extends through the head $B^5$ and front of the casing A to the outside thereof, and carries this outer end or knob $I^4$, formed in its periphery with two notches, one of which is engaged at a time by a pawl $I^5$ pivoted to the front of the casing A. See Fig. 1. This pawl $I^5$ serves to lock the scraper I either in an open or closed position, that is, when the pawl $I^5$ is thrown back by the operator, then the latter can turn the knob $I^4$ to throw the scraper I, either in or out of contact with the cylinder B, and as soon as the desired position is reached the operator moves the pawl $I^5$ downward into engagement with the desired notch on the knob $I^4$, to lock the latter and consequently the scraper into the desired position.

It is sometimes desirable to permit the frozen substance, hanging to the inside of the rim of the cylinder B, to pass more than once around before being scraped off and, for this purpose, the scraper can be opened from the outside by the operator turning the knob $I^4$ until the material is sufficiently frozen. When this is done, the scraper I is moved in contact with the rim of the cylinder B, to scrape off the frozen substance onto the endless carrier belt K, to be carried to the outside for consumption.

In order to impart the necessary movement to the several operating parts of the machine, we provide a main driving shaft N carrying fast and loose pulleys N', connected by a belt with suitable machinery for imparting a rotary motion to the said shaft N, which latter, however, may also be turned by hand if desired. On the main driving shaft N, is secured a beveled gear wheel O in mesh with a beveled pinion O', secured on the longitudinally extending shaft $O^2$, journaled in suitable bearings and carrying a beveled gear wheel $O^3$ in mesh with a beveled gear wheel $B^6$, secured on the shaft $B^2$ carrying the cylinder B, as previously described. Thus, when the main driving shaft N is rotated, the gear wheels O, O', the shaft $O^2$ and gear wheels $O^3$, $B^6$, impart a rotary motion to the shaft $B^2$ of the cylinder B, in the direction of the arrow $a'$.

On the main driving shaft N is secured a spur wheel P in mesh with a pinion P' secured on an auxiliary shaft $P^2$, mounted to turn in suitable bearings and carrying a large pulley $P^3$, connected by a belt $P^4$ with a small pulley $H^3$, fastened on the shaft $H^2$ of the blower H. The rotary motion of the main driving shaft N is transmitted by the gear wheel P, pinion P', pulley $P^3$, belt $P^4$ and pulley $H^3$ to the shaft $H^2$ of the blower H, so that an air blast is discharged through the pipe H' into the pipe G, to pass into the chamber D to divide the cream or other liquid, as previously explained.

In order to impart a traveling motion to the endless carrier belt K, we provide the shaft $O^2$ with a pulley Q connected by a cross belt Q', with a pulley $Q^2$ secured on the longitudinally extending shaft K' journaled in suitable bearings on the front of the casing A, the said shaft K' carrying the front wheel $K^2$, over which passes the endless carrier belt K, the latter also passing at its rear or inner end over a wheel $K^3$ journaled in the sides of the frame J. See Fig. 5.

It will be seen that by the arrangement described, cream or other liquid is quickly changed into frozen substance by the action of an air blast dividing the cream into fine particles and passing onto a cool revolving cylinder, in the manner above described, the frozen material being finally scraped off from the rim of the cylinder and carried outside to be consumed.

Having thus fully described our invention, we claim as new and desire to secure by Letters Patent—

1. An ice cream freezer, comprising a cylinder mounted to turn in an ice box, a perforated plate or sieve over which passes the cream or other liquid to be frozen, the said plate or sieve being arranged in close proximity to the said cylinder, and an air blast pipe for forcing air against the said perforated plate to minutely divide the cream or other liquid and forcing the minutely divided particles onto the said cylinder as the latter revolves, substantially as shown and described.

2. An ice cream freezer comprising a revoluble cooling cylinder, an air blast chamber arranged within the said cylinder and provided with a perforated plate over which passes the liquid to be frozen, and means for forcing air into the said chamber and through the said perforated plate to minutely divide the liquid passing over the same, and to force the minutely divided particles onto the inner surface of the revoluble cylinder, substantially as shown and described.

3. An ice cream freezer comprising a cylinder mounted to turn in an ice box, an air blast chamber arranged within the cylinder and connected with a suitable air supply pipe for forcing air under pressure into the said chamber, the latter being provided with a perforated plate in close proximity to the rim of the said cylinder, and a liquid supply pipe for discharging the liquid over the said plate, substantially as shown and described.

4. An ice cream freezer comprising a cylinder mounted to turn in an ice box, an air blast chamber arranged within the cylinder and connected with a suitable air supply pipe for forcing air under pressure into the said chamber, the latter being provided with a perforated plate in close proximity to the rim of the said cylinder, a liquid supply pipe for discharging the liquid over the said plate, and a scraper arranged through the said cylinder and adapted to engage the inner surface thereof, to scrape off the frozen surface, substantially as shown and described.

5. An ice cream freezer comprising a cylinder mounted to turn in an ice box, an air blast chamber arranged within the cylinder and connected with a suitable air supply pipe for forcing air under pressure into the said chamber, the latter being provided with a perforated plate in close proximity to the rim of the said cylinder, a liquid supply pipe for discharging the liquid over the said plate, a scraper arranged through the said cylinder and adapted to engage the inner surface thereof, to scrape off the frozen surface, and an endless carrier belt into which discharges the said scraper, the said carrier belt serving to carry the frozen substance to the outside of the box, substantially as shown and described.

6. An ice cream freezer comprising a cylinder mounted to turn in an ice box, an air blast chamber arranged within the cylinder and connected with a suitable air supply pipe for forcing air under pressure into the said chamber, the latter being provided with a perforated plate in close proximity to the rim of the said cylinder, a liquid supply pipe for discharging the liquid over the said plate, a scraper arranged through the said cylinder and adapted to engage the inner surface thereof, to scrape off the frozen surface, and means substantially as described for opening and closing the said scraper to move the latter in or out of contact with the said cylinder, as set forth.

GIUSEPPE OTTINO.
ANTONIO RAFFO.

Witnesses:
THEO. G. HOSTER,
C. SEDGWICK.